1.00 SQUARE MESH
0.80 SQUARE OPENING
0.20 WEB 2.00 SQUARE MESH
1.80 SQUARE OPENING
0.20 WEB

May 27, 1952  C. F. KAYAN  2,598,267
MEANS FOR PREDETERMINING TEMPERATURE
CONDITIONS WITHIN WALL STRUCTURES
Filed Nov. 29, 1945  5 Sheets-Sheet 5

INVENTOR.
Carl F. Kayan
BY
Moses, Nolte, Crews + Berry
ATTORNEYS

Patented May 27, 1952

2,598,267

UNITED STATES PATENT OFFICE 2,598,267

MEANS FOR PREDETERMINING TEMPERATURE CONDITIONS WITHIN WALL STRUCTURES

Carl F. Kayan, New York, N. Y.

Application November 29, 1945, Serial No. 631,672

2 Claims. (Cl. 235—61)

This invention relates to means for analyzing thermal conditions in wall structures, and particularly for making such analyses by analogy to electrical principles.

The invention has particularly to do with the development of an electrical model through which the requisite structure of a wall may be determined for meeting predetermined temperature conditions in advance of the actual construction of the wall.

Through the medium of the resistance concept, the general similarity of "contour maps" for heat flow and electrical flow may be visualized. The electrical analogy permits ready study of simple and complex heat flow conditions which, because of distorted temperature conditions, would defy orthodox mathematical or graphical analysis. Internal temperature lines (isotherms) obtained by relatively simple equipment with a geometrical type of analyzer are shown for one complex case of flow conditions.

The present analyzer is of the geometrical type and primarily for steady state one and two dimensional studies. It permits inclusion of fluid boundary conditions for multiple homogeneous materials in the heat flow path. Thus it is not limited to isothermal conditions at the boundary walls, and to one single material. Broadly considered, it is founded on the basic principles of the electrical analogy; equivalent temperature conditions for a heat flow path can be determined through analysis of an electrical flow path in which the component resistances have the same relationship between themselves as the thermal resistances. In both types of flow the potential difference is equal to the product of flow rate and resistance.

The analyzer will be best understood by considering a particular case.

In the drawing forming part of this specification

Figure 1:
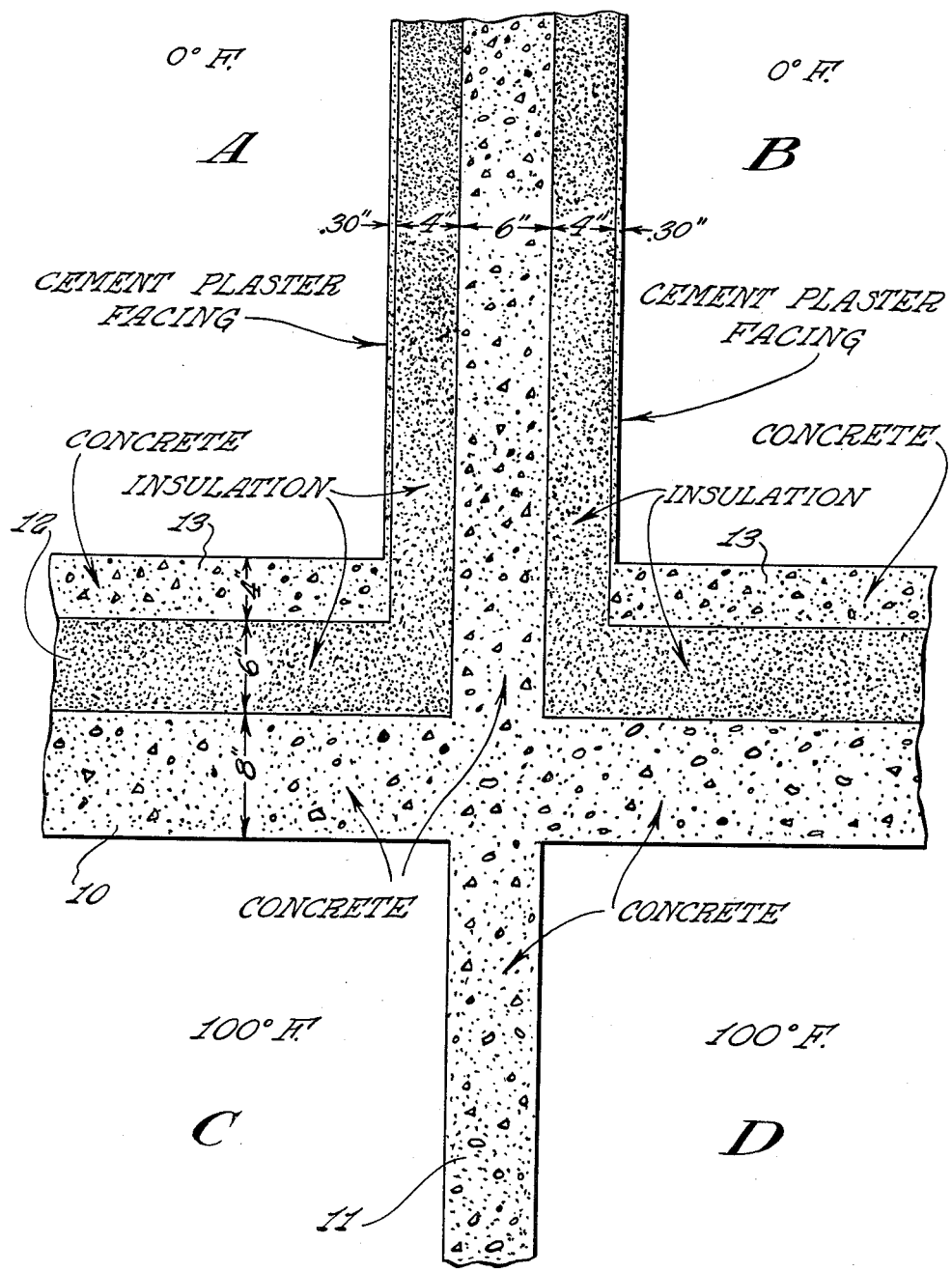
Fig. 1 is a view in sectional elevation showing fragments of four rooms separated from one another by a floor and a vertical wall, the two upper rooms being at a relatively low temperature and the two higher rooms at a relatively high temperature.

In Fig. 1 upper rooms A and B are illustrated as being maintained at 0° F., while lower rooms C and D are illustrated as maintained at 100° F. The temperatures referred to are, of course, purely illustrative and have been chosen in order to obviate arithmetical calculations and in order to facilitate interpretation of the results secured. The upper rooms A and B are separated from the lower rooms C and D by a concrete floor 10. A concrete wall 11 separates the rooms A and C from the rooms B and D. The floor and the cold wall, in addition, carry insulation 12 with a concrete layer 13 added for physical protection. Dimensions are indicated in the figure, but these are, of course, to be regarded as purely illustrative of the particular example. Since opposite conditions are similar (mirrored), only one side need be analyzed as set up by the center line. (This is equivalent to considering perfect insulation at the center line boundary.) It is desired to obtain the steady state internal temperature lines, as well as the underside floor and wall surface temperatures in the rooms C and D, to study possible condensation under humid conditions.

The boundary condition produced by the still air in both rooms is readily interpreted through the "film" concept of heat transfer added and coupled to the resistance concept. Considering resistances on the unit area basis, the air boundary resistance $R_a$, °F./[B. t. u./(ft.²) (hr.)], may be defined as $$R_a = \frac{1}{h_a} \qquad (1)$$

where $h_a$ = air side surface conductance, B. t. u./(ft.²) (hr.) (°F.). The resistance $R_w$, °F./[B. t. u./(ft.²) (hr.)], of the wall material:

$$R_w = \frac{L_w}{K_w} \qquad (2)$$

where $L_w$ = thickness of wall material, feet;
$k_w$ = thermal conductivity of wall material, B. t. u./(ft.²) (hr.) (°F./ft.).

Thus, for a given value of $h_a$ there is a corresponding value of resistance $R_a$. For a given conductivity of wall material, there is some equivalent length or thickness $L_e$ of material that would give the same resistance $R_e$ to heat transfer as the air boundary;

$$R_a = \frac{1}{h_a} = R_e = \frac{L_e}{k_w} \qquad (3)$$

thus:

$$L_e = \frac{k_w}{h_a} \text{ feet} \qquad (4)$$

Hence, if there were involved only an air boundary and a wall thickness, the equivalent electrical resistances to represent the conditions would be proportional to $L_e$ and $L_w$. For conductive sheet of uniform unit resistance, therefore, these resistances could be represented by proportional lengths directly on the sheet. This takes care of the fluid boundary conditions, in terms of equivalent length of solid material to produce the same resistance effect. (Though not so apparent, the same general result would be produced by direct consideration in terms of the resistance concept.)

The next point to be considered is the problem of insulation, or of different materials in the heat flow path. Considering the solid wall as the basic material in the problem, lengths of the actual heat flow path are directly represented on the conductive sheet. However, insulation in the geometrical electrical analogy requires increased unit resistance in the sheet material to represent increased thermal resistance: this is brought about by modifying the electrical characteristics of the sheet.

Figure 2:
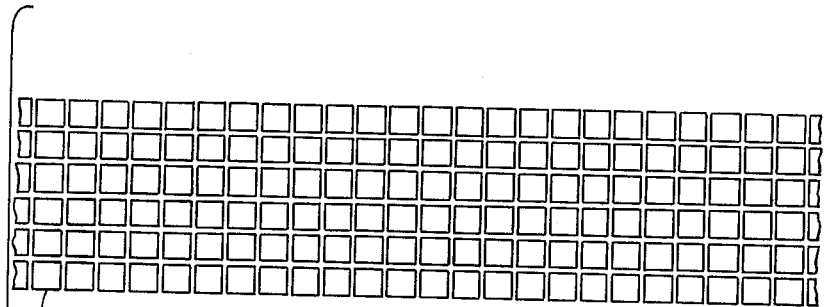
Fig. 2 shows conductive sheets perforated to produce desired resistance characteristics in accordance with principles utilized in the analyzer.
Figure 2:
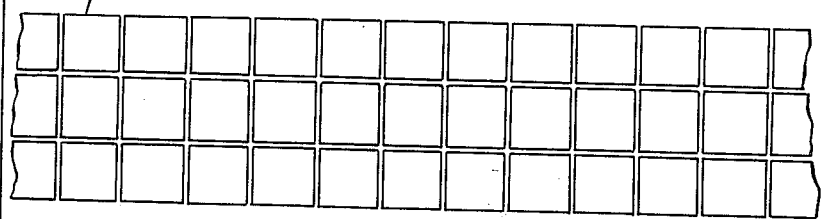

The effective electrical unit resistance of a given section may readily be altered by cutting the sheet carefully into a mesh pattern (perforating). This alteration may be made in progressive steps during an investigation, thus covering different values of equivalent thermal resistance in insulation, and enabling progressive study as well as interpolation for exact value. One type of mesh that may readily be used is the square mesh, shown in Figure 2, with progressive alteration. The transverse (edge to edge) resistance of mesh sheet as compared with equivalent solid sheet increases as the amount of cut-out area increases. The resistance characteristics may be determined by direct comparative electrical measurements. (For a 1.00 inch nominal mesh, 0.80 inch square holes and 0.20 inch web the resistance ratio was measured and averaged about 4.6). Of course, it is essential that one continuous sheet be used and that the webs of the mesh be in no way cut through.

The conductive sheet referred to may be a paper sheet having a conductive metallic coating or foil on its surface whose conductivity is known.

Figure 3:
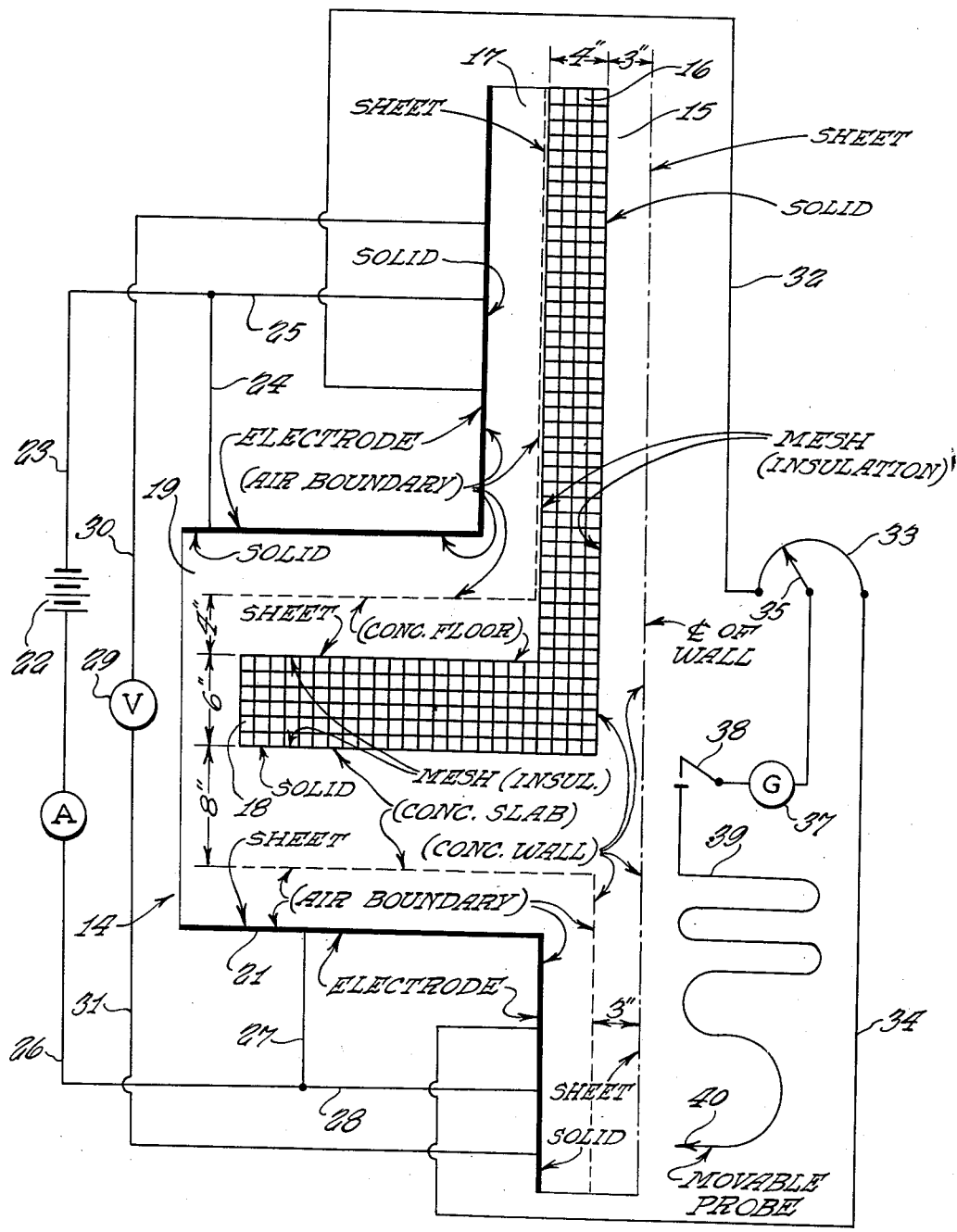
Fig. 3 illustrates an analyzer in which the wall conditions of Fig. 1 are simulated.

Based on the principles outlined, a geometrical model representing the insulated structure of Fig. 1 has been constructed and is shown in Fig. 3 with its electrical connections for the one-half section of the symmetrical layout. In accordance with the geometrical model requirements the proportions are to scale; as a matter of fact the model is full size and of the actual structure dimensions. It is made from one large continuous sheet of metalized paper.

In addition to the dimensions shown in Fig. 1, the following basic data have been assumed for the problem: $h_a$, representing still air, has been taken at 1.65 B. t. u./(ft.$^2$)(hr.)(°F.) for all of the air boundaries. This could readily be varied for different conditions. The conductivity of the concrete floor and wall, taken as equal, has been assumed as 0.50 B. t. u./(ft.$^2$)(hr.)(°F./ft.). Thus $$L_e = \frac{k_w}{h_a} = \frac{0.50}{1.65} = 0.303 \text{ feet} = 3.63 \text{ inches}$$

Using continuous metalized conductive sheet 14 for the geometrical model, one edge of the sheet is assumed to represent the center line 15—15 of the wall, Fig. 3. The wall proper as the basic material is represented by a three inch width on the sheet as measured from the center line edge 14—14. As shown at the bottom, an additional 3.63 inches represents the air boundary effect on the bare concrete wall. This width is chosen to introduce a proper resistance value in relation to the known conductance characteristics of the concrete. The four inches of interposed insulation on the upper wall are represented by a four inch strip 16 of modified sheet as produced by cutting a mesh pattern in the original sheet. To account for the 0.30 inch of concrete facing as well as the air boundary, the additional solid material 17 on the upper wall is 3.93 inches. Similar treatment is arranged for the floor conditions, six inches of insulation 12 being represented by six inches of modified sheet 18, the floor slab and air boundary together being represented by 7.63 inches of solid sheet 19. The treatment for the different parts is clearly shown in the diagram of Fig. 3. An electrode 20 making good line contact with the sheet is fastened down at the limiting positions as shown. Thus, isopotential conditions are established for the air. A similar electrode 21 is similarly secured in place to establish isopotential conditions for the air in the lower room C.

A battery 22 has one of its terminals connected through conductors 23, 24, and 25 to the electrode 20, and its opposite terminal connected through conductors 26, 27, 28 to the electrode 21. A voltmeter 29 is connected through conductors 30 and 31 to the respective electrodes 20 and 21, and always indicates the total difference of potential between the electrodes. The electrode 20 is connected through a conductor 32 to a variable resistor 33, while the opposite terminal of the resistor 33 is connected through a conductor 34 to the electrode 21. A sliding adjustable contact 35 engages the resistor 33 and is connected through a conductor 36 with a galvanometer 37. The galvanometer 37 is connected through a switch 38 and a conductor 39 with a conductive probe 40. When the probe is placed in contact with a point whose potential is to be measured, current is caused to flow through the galvanometer 37 deflecting the galvanometer needle. The sliding contact 35 is then adjusted to restore the galvanometer to its balanced or neutral condition. A graduated scale may be provided in association with the slidable contact 35, the graduations being desirably in percentages, so that the instrument will indicate directly the potential of the point at which the probe is located in terms of percentage of the total voltage drop, the total being indicated on the voltmeter 29. The percentage indicated opposite the pointer 35 is, however, the thing which is of interest since the voltage employed may be arbitrarily selected or may vary from time to time.

Figure 4:
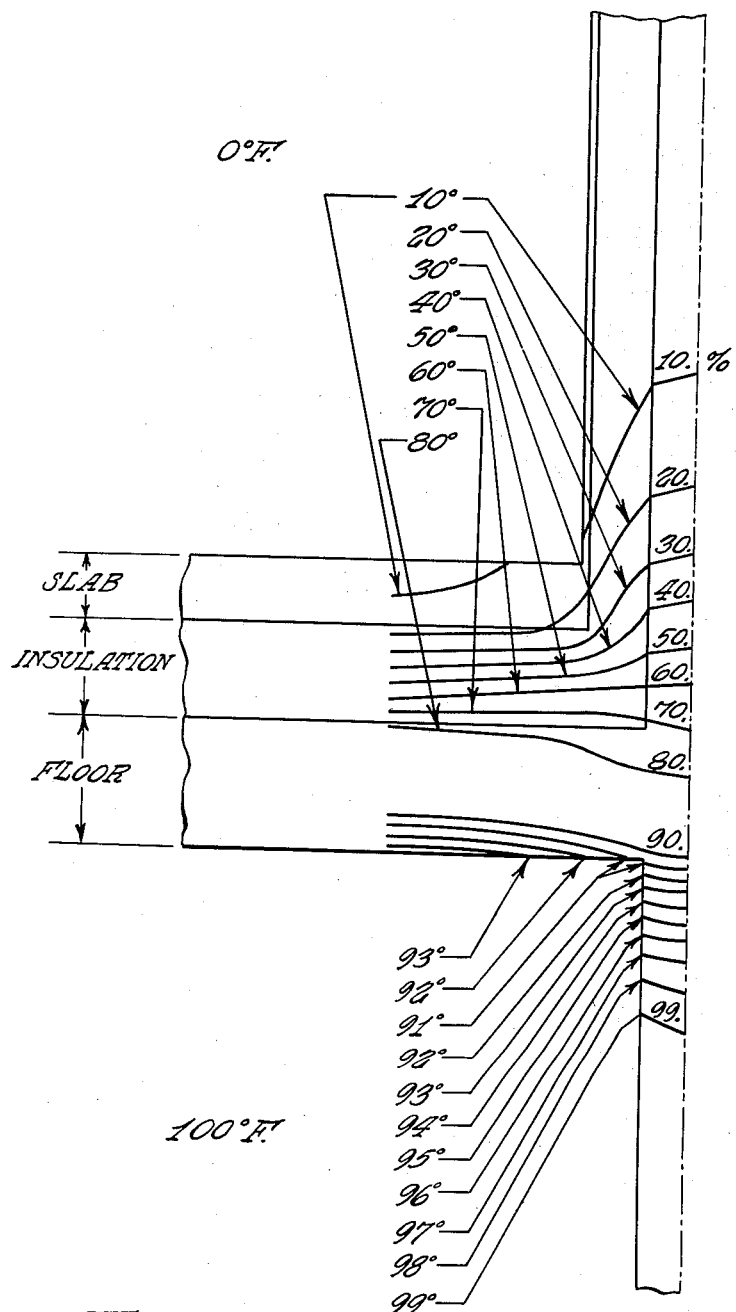
Fig. 4 shows a graphic portrayal of thermal conditions indicated for the illustration of Fig. 1 by the use of the analyzer of Fig. 3.

The results are best illustrated by a "contour map" of relative electrical potentials with equivalent temperatures shown. Thus, the 90% isopotential line (.900) is equivalent, for an overall value of $\Delta t = 100°$ F. to $100 \times .900 = 90°$ F. Fig. 4 represents such a contour map for the 1 inch mesh, that is, for insulation having a resistance ratio of about 4.6; i. e. $k_{ins} = 0.109$, B. t. u./(ft.$^2$)(hr.)(°F./ft.).

It must be pointed out that the method is dependent on the uniformity of the sheet electrical conductivity in all directions. This has been a problem and various materials have been studied from this point of view. In addition, an analysis by this method can be no better than the original assumed data and physical properties. Also receiving further consideration is the requirement that the resistance ratio for mesh in all directions should be the same. This is somewhat dependent on the accuracy of cutting and duplicating the mesh. Present investigations show an apparent deviation of less than 5%. It should further be noted that the model for multiple thermal conditions may also be built up by using different component materials such as sheet of different unit resistance, with or without mesh.

In 1913 Langmuir, Adams and Meikle "Flow of Heat through Furnace Walls," Trans. American Electrochemical Society, vol. 24, 1913, pp. 53–84, described the use of an electrical bath in a shallow tank for model study of different heat flow shapes, as for example, a thick corner. Here the inside and outside surfaces of a thick corner in two dimensional heat flow were represented in the model by metal corners forming the vertical walls of the tank. Beyond the corner for each wall were set up boundary partitions, these and the tank bottom being made of non-conducting material. A conducting reflecting electrolyte represented the single isotropic homogeneous material of the heat flow corner. With an A. C. electrical potential established between the parallel wall electrodes, the equivalent of steady state heat flow conditions between constant temperature walls was set up. By means of an electrical probe isopotential lines representing isothermal lines in the solid body could be established. This was truly a geometrical heat flow analogue.

The extension of the geometrical analogy in steady state flow to cover fluid boundary resistances as well as multiple materials of different relative conductivity has been undertaken for the tank (electrolyte) method. Here the solid boundaries of the structure are associated with a thermal film resistance. This is represented by tank-wall electrodes, having electrical resistances interposed between them and the electrical potentials representing the fluid temperature levels.

The problem of altering the electrical resistance of the liquid bath according to the fixed pattern of the actual structure is quite important and accordingly has been studied in detail. The liquid bath, it must be remembered, is conductive by virtue of its behavior as an electrolyte. Salt solutions such as NaCl, etc., take care of this requirement. But for different unit resistances in different parts of the tank in effect a different material must be present. This can be realized to some measure by using sand or other porous material for the more resistive sections of a structure, the electrolyte penetrating the porous material in its fixed location.

More promising results have been obtained in another manner. The goal in the ideal is to have material combinations whose proportional resistances can be adjusted at will, to cover different physical characteristics of structural materials. The use of a solidified jelly bath (about 1" deep) with different amounts of dissolved salt is proposed for this purpose. The jelly is liquid at temperatures somewhat above atmospheric, and different amounts of salt may be dissolved in it while it is in the liquid form. As a practical operation, different material combinations may readily be made up by using plain salt solution against a solid jelly mass. Different shape configurations may be cut out of the solidified jelly mass to conform to the actual structure shapes. The jelly, a semi-rigid solid mass, is still soft enough to permit the penetration of an exploring potential probe.

Figure 5:
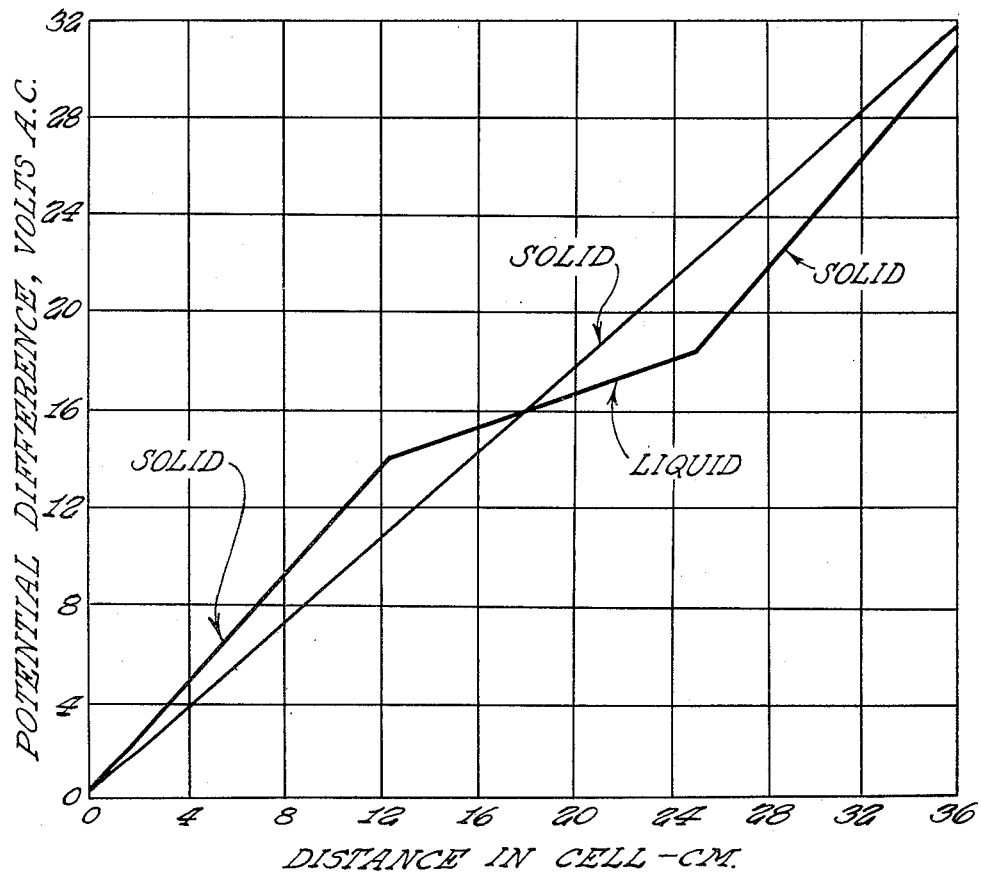
Fig. 5 is a graph covering an electrolytic analyzer and showing the relationship of potential to length of path when a jelly mass is employed.

Fig. 5 shows A. C. results (potential vs. length of path) for a test cell originally containing one solid jelly mass between its end electrodes, as well as the results with the middle-third solid section cut out and replaced by a liquid electrolyte of different conductivity from the solid. The sharp change of slope clearly shows the differing possibilities in the analysis of complex flow systems.

The present method offers possibility in handling numerous complex flow problems in different fields of stable flow on a simple basis. One problem of interest in this connection is that of extended surface. Another is that of diffusion. The equipment required is not complex, and the general advantage of geometrical similarity to actual configurations makes it an attractive working tool.

I have described what I believe to be the best embodiments of my invention. I do not wish, however, to be confined to the embodiments shown, but what I desire to cover by Letters Patent is set forth in the appended claims.

I claim:

1. A scale model in simulation of a wall cross-section for use in pre-determining by electrical analogy thermal conditions which will exist within the wall under pre-determined temperature conditions adjacent the wall surfaces, comprising a single sheet of conductive material adapted to be easily cut, and having an unmodified area whose width corresponds to the thickness of one wall material, and a perforated area whose width corresponds to the thickness of a second wall material of lower thermal conductivity.

2. A scale model in simulation of a wall cross-section for use in pre-determining by electrical analogy thermal conditions which will exist within the wall under predetermined temperature conditions adjacent the wall surfaces, comprising a single metallic paper sheet of conductive material having an unmodified area whose width corresponds to the thickness of one wall material, a perforated area whose width corresponds to the thickness of a second wall material of lower thermal conductivity, and a third area whose width is so chosen in relation to its known electrical resistance characteristics, to correspond proportionally in its electrical resistance to the resistance to heat transfer at the surface of the wall.

CARL F. KAYAN.

REFERENCES CITED

The following references are of record in the file of this patent:

UNITED STATES PATENTS

| Number | Name | Date |
|---|---|---|
| 423,223 | Dewey | Mar. 11, 1890 |
| 1,068,907 | Kraeuter | July 29, 1913 |
| 1,679,730 | MacDonald | Aug. 7, 1928 |
| 1,918,001 | Stone | July 11, 1933 |

OTHER REFERENCES

"Conformal Transformation With the Aid of An Electrical Tank," K. N. E. Bradfield, S. G. Hooker and R. V. Southwell; Proceedings of the Royal Society of London; vol. 159A, pages 315–346; April 1937.